United States Patent [19]

St. Clair et al.

[11] Patent Number: 5,147,966

[45] Date of Patent: Sep. 15, 1992

[54] POLYIMIDE MOLDING POWDER, COATING, ADHESIVE AND MATRIX RESIN

[75] Inventors: Terry L. St. Clair, Poquoson; Donald J. Progar, Yorktown, both of Va.

[73] Assignee: The United States of America as represented by the Administrator of the National Aeronautics and Space Administration, Washington, D.C.

[21] Appl. No.: 560,717

[22] Filed: Jul. 31, 1990

[51] Int. Cl.$^5$ .................. C08G 73/10; C08G 69/26; C08G 63/00
[52] U.S. Cl. .................. 528/188; 528/125; 528/126; 528/128; 528/173; 528/179; 528/182; 528/185; 528/220; 528/229; 528/351; 528/353; 524/600; 524/607; 428/364; 428/375; 428/378; 428/473.5; 427/385.5; 427/407.1; 156/308.2; 156/309.9; 156/324
[58] Field of Search ............. 528/125, 126, 128, 173, 528/179, 182, 185, 188, 220, 229, 351, 353; 524/600, 607; 428/473.5, 364, 375, 378; 156/308.2, 309.9, 324; 427/407.1, 385.5

[56] References Cited

U.S. PATENT DOCUMENTS

| | | | |
|---|---|---|---|
| 4,543,295 | 9/1985 | St. Clair et al. | 428/458 |
| 4,595,548 | 6/1986 | St. Clair et al. | 528/183 |
| 4,603,061 | 7/1986 | St. Clair et al. | 428/336 |
| 4,837,300 | 6/1989 | St. Clair et al. | 528/125 |
| 4,895,972 | 1/1990 | Stoakley et al. | 528/353 |

Primary Examiner—John Kight, III
Assistant Examiner—P. Hampton-Hightower
Attorney, Agent, or Firm—George F. Helfrich

[57] ABSTRACT

The invention is a novel polyimide prepared from 3,4'-oxydianiline (3,4'-ODA) and 4,4'-oxydiphthalic anhydride (ODPA), in 2-methoxyethyl ether (diglyme). The polymer has been prepared in ultra high molecular weight and in a controlled molecular weight form which has a 2.5 percent offset is stoichiometry (excess diamine) with a 5.0 percent level of phthalic anhydride as an endcap. This controlled molecular weight form allows for greatly improved processing of the polymer for moldings, adhesive bonding, and composite fabrication. The higher molecular weight version affords tougher films and coatings. The overall polymer structure groups in the dianhydride, the diamine, and a metal linkage in the diamine affords adequate flow properties for making this polymer useful as a molding powder, adhesive, and matrix resin.

18 Claims, No Drawings

POLYIMIDE MOLDING POWDER, COATING, ADHESIVE AND MATRIX RESIN

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to the preparation of adhesives, matrix resins for composites, molding powders, films, and laminates, especially those showing enhanced flow with retention of mechanical and adhesive properties.

2. Description of the Related Art

High performance polyimide adhesives are used in the aerospace industry, for example, in joining metals to metals or metals to composite structures. In addition they are rapidly finding new uses as matrix resins for composites, molding powders and films. These materials display a number of performance characteristics such as high temperature and solvent resistance, improved flow for better wetting and bonding, high modulus, chemical and hot water resistance, etc. One area of application is in the manufacture of lighter and stronger aircraft and spacecraft structures.

LARC-TPI is a thermoplastic polyimide well known as a high performance material (V. L. Bell, B. L. Stump and H. Gager, *J. Polym, Sci., Poly. Chem. Ed.* 14,2275 (1976); D. J. Progar, V. L. Bell and T. L. St. Clair, NASA Langley Research Center, "Polyimide Adhesives", U.S. Pat. No. 4,065,345 (1977); V. L. Bell, NASA Langley Research Center, "Process for Preparing Thermoplastic Aromatic Polyimides", U.S. Pat. No. 4,094,862 (1978); A. K. St. Clair and T. L. St. Clair, NASA Langley Research Center, "High Temperature Polyimide Film Laminates and Process for Preparation Thereof", U.S. Pat. No. 4,543,295 (1985); A. K. St. Clair and T. L. St. Clair, "A Multi-Purpose Thermoplastic Polyimide", SAMPE Quarterly, October 1981, pp. 20–25).

Its structure, as shown below, is derived from 3,3',4,4'-benzophenonetetracarboxylic dianhydride (BTDA) and 3,3'-diaminobenzophenone (3,3'-DABP)

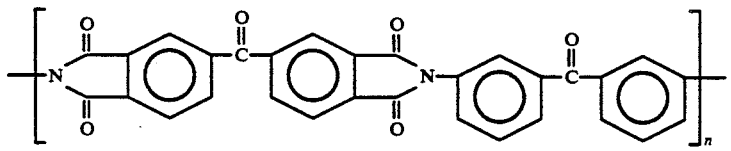

and is prepared in 2-methoxyethyl ether (diglyme). It was invented at NASA Langley Research Center and is a commercially available product sold by Mitsui Toatsu (Mitsui Toatsu Chemicals, Inc., New York) and the Rogers Corporation (D. C. Sherman, C. Y. Chen and J. L. Cercena, *SAMPE Preprints*, 33, 134, 1988) as a molding powder, polyamic acid solution and film.

The commercialization of the 3,3'-DABP component of LARC-TPI has not occurred in the United States because it has been shown to be a mutagen. (W. D. Ross, J. E. Nobel, J. A. Gridley, J. M. Fullenkamp, M. T. Winiger and J. A. Graham, "Mutagenic Screening of Diamine Monomers", NASA Contractor Report 166085, Monsanto Research Corporation, February 1983.) Hence, only experimental samples of this chemical can be purchased for research purposes. One U.S. company prepares and polymerizes the 3,3'-DABP in situ, limiting the exposure of workers to this diamine. However, this process is costly.

In addition, the original version of LARC-TPI, a solution of polyamic acid in diglyme, appears to have an undesirably large and/or broad molecular weight distribution, containing amine and anhydride functional end groups such that the initial imidized powders do not mold well and exhibit poor melt stability.

Bell (U.S. Pat. No. 4,094,862) discloses a polyimide of the same structural form as the one claimed by the present invention. Bell did not actually make a polyimide of this structure, and Bell does not mention any improvement over other polyimide structures that will result from the structure of the present invention. The oxygen flexibilizing groups of the present invention give the new polyimide good flow properties. Bell also used BTDA and 3,3'-DABP as possible precursors to his new polyimides, and makes no mention of the use of 3,4'-oxydianiline (3,4'-ODA) or 4,4'-oxydiphthalic anhydride (4,4'-ODPA). One purpose of the present invention, however, is to make an improvement on polyimides formed from BTDA and 3,3'-DABP.

Berdahl et al (U.S. Pat. No. 4,808,731) disclose that ODPA is a well known monomer used in the synthesis of polyimides having good thermal properties and high solvent resistance. Berdahl et al also use BTDA to create this type of polyimide. Berdahl et al do not mention the good flow properties of ODPA and 3,4-ODA caused by the presence of oxygen flexibilizing groups which make the present polyimide unique.

St. Clair et al (U.S. Pat. No. 4,389,504) and St. Clair et al (U.S. Pat. No. 4,497,935) both disclose a rubber toughened addition-type polymer composition made by chemically reacting an amine terminated elastomer and an aromatic diamine with an aromatic dianhydride with which a reactive chain stopper anhydride has been mixed, and utilizing solvent or a mixture of solvents for this reaction. The processes use ODPA and isomers of oxydianiline (although not 3,4'-ODA by name). The present invention, however, is producing a very different substance. No elastomer additions are made in the present invention, which, therefore, has very different characteristics, such as flow, etc.

St. Clair et al (U.S. Pat. No. 4,595,548) (hereinafter St. Clair et al '548) disclose a process for preparing essentially colorless polyimide film containing phenoxylinked diamines. One way to obtain this film is to use a polyimide made from ODPA and o,p'-ODA or m,m'-ODA. The use of 3,4'-ODA is not mentioned. St. Clair et al '548 is focused mainly on producing a clear film, and to achieve this result an essential part of the process is to use recrystallized or sublimated aromatic diamines. This is not the case with the present invention. There is no discussion on attempting to achieve tougher, higher molecular weights, or good adhesive qualities.

Olivier (U.S. Pat. No. 3,324,181) is concerned with endcapping polyimides to improve processing ability. It and the present invention both use phthalic anhydride as the endcapper. However, none of the polyimides that Olivier discusses has the formula of the polyimide of the present invention. The present invention can also use more mole percentage of phthalic anhydride as an endcapper than Olivier discloses, and somewhat different percentages of diamine and dianhydride. This suggests that simply following Olivier's disclosures would not lead to a processable polyimide.

SUMMARY OF THE INVENTION

This invention is a new composition of matter and the process for the production of that new composition.

An object of this invention is a novel polymer in an endcapped and unendcapped form which exhibits melt flow and adhesive properties that make it attractive as a matrix resin for composites, a molding powder, an adhesive, a polymer film, and as a film for coatings.

Another object of this invention is to provide a process for preparing and using aromatic polyimides which reasonably process to make fiber-reinforced composites composed of an organic resin and a reinforcing fiber.

Another object of this invention is to provide a process for preparing and using aromatic polyimides as adhesives that can be reasonably processed to give materials with high bonding strengths and thermooxidative stability.

Another object of this invention is to provide a process for preparing well-consolidated polyimide moldings by heating imidized powders at high temperatures and pressures.

Another object of this invention is to provide a process for preparing thin films and coatings by heating a polyamic acid solution on a substrate.

The foregoing invention is a novel polymer that has been prepared from 3,4'-oxydianiline (3,4'-ODA) and 4,4'-oxydiphthalic anhydride (ODPA) in 2-methoxyethyl ether (diglyme). The combination is shown below:

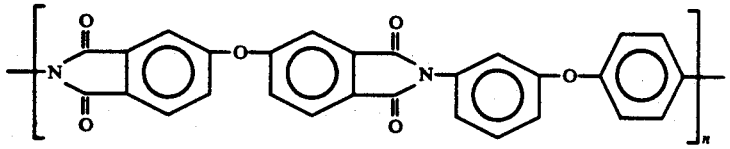

This polymer is prepared in ultra high molecular weight (exact stoichiometry of diamine and dianhydride) and in a controlled molecular weight form which has a 2.5-5.0 percent offset in stoichiometry (excess diamine) with a 5.0-10.0 percent level of phthalic anhydride as an endcap. This controlled molecular weight form allows for greatly improved processing of the polymer for moldings, adhesive bonding, and composite fabrication. The higher molecular weight version affords tougher films and coatings. The glass transition temperature of the polymer as determined by differential scanning calorimetry is between 230° C. and 240° C. The overall polymer structure with oxygen flexibilizing groups (in both the dianhydride, the diamine, and a meta linkage in the diamine) affords adequate flow properties for making this polymer useful as a molding powder, adhesive, and matrix resin.

This composition has been found to have properties which make it very attractive for many applications. Of special importance is the fact that by preparing polyimides and polyamic acids from ODPA and 3,4'-ODA with suitable endcaps, adhesives, composite matrix resins, neat resin moldings, and films or coatings having identical or superior properties to commercially available polyimides have been generated.

Polyimides and polyamic acids made with ODPA and 3,4'-ODA have been used to prepare graphite-reinforced composites using the endcapped version because of its superior melt flow over the unendcapped version. This higher level of melt flow is important in making large, complex-shaped composites. The composites were consolidated from graphite fiber that had been coated with ODPA and 3,4-ODA from a solution of diglyme. After drying at 175° C. the consolidation was accomplished at 350° C. under 300 psi pressure.

DESCRIPTION OF THE PREFERRED EMBODIMENTS

The invention and its advantages are illustrated completely by the specific examples given below. Lap shear tensile strength measurements were conducted according to the American Society for Testing Materials (ASTM) D-1002 (CTM No. 26). Titanium lap shear specimens were fabricated from four-finger panels. Each finger test joint specimen was 2.54 cm (one inch) wide and the bonded overlap was 1.27 cm (0.5 inch). The titanium finger panels were fabricated from 6-aluminum 4-vanadium titanium alloy, nominally 0.127 cm (0.050 inch) thick. The metal panels were given a Pasa Jell surface treatment prior to priming and bonding.

EXAMPLES

Example I

ODPA/3,4-ODA: A portion of ODPA (61.97 g, 0.20 moles) was slurried in 578 g of diglyme. Next the 3,4'-ODA (40.00 g, 0.20 moles) was added and the slurry was stirred overnight (16 hours). During the stirring process the mixture became very viscous as molecular weight increased and two phases formed-solvent rich and polymer rich. As this two-phase system was cooled to approximately 15° C. with stirring it became homogeneous. Slight warming back to room temperature resulted in the phase separation (completely reversible with subsquent cooling). This polyamic acid had an inherent viscosity of 0.63 deciliters/gram when measured at 0.5 percent solids in N,N-dimethylacetamide at 35° C.

Example II

ODPA/3,4'-ODA of Offset Stoichiometry with Endcapping: The ODPA (60.494 g, 0.195 moles) was mixed with 3,4'-ODA (40.048 g, 0.200 moles) in 515 g of diglyme at ambient conditions. This mixture was stirred overnight (16 hours) and the phthalic anhydride (PA) endcapper (1.481 g, 0.010 moles) was added and stirring was continued for one-half hour. This solution was stored for 48 hours in a refrigerator and after that period it had an inherent viscosity of 0.467 deciliters/gram when measured at 0.5 percent solids in N,N-dimethylacetamide at 35° C. The same reaction was repeated with a five mole percent deficit of ODPA and a ten mole percent addition of PA.

Example III

Preparation of Molding Powder: A portion (60 mls) of the polymer from Example II was decanted into a blender and diluted with 60 mls of N-methylpyrrolidinone (NMP). Next 60 mls of triethylamine were added and the resulting mixture was stirred for approximately 40 minutes. After this period 60 mls of acetic anhydride was added and stirring was continued for one hour. A 100 ml addition of distilled water was made with a slight exotherm resulting due to the water reacting with the excess acetic anhydride. A precipitate formed which was collected by suction filtration. It was rewashed with water in the blender to eliminate residual solvent, acetic acid and triethylamine. This solid was dried in air at room temperature for one hour, then one hour at 100° C. followed by overnight (16 hours) treatment at 160°–165° C. This granular, off-white powder was used for molding.

Example IV

Preparation of Unifilled Molding: One gram of the powder from Example III was placed in a matched-metal-die mold preheated to 300° C. and placed under 300 psi. The mold and sample were held at 300° C. under this pressure for 15 minutes and cooled to room temperature. A well consolidated molded disk was removed from the mold.

Example V

Preparation of Graphite Fiber with Polymer Coating: A 60 ml portion of polymer in diglyme solvent from Example II was coated onto a Hercules, Inc. continuous graphite fiber (AS4-Tradename). The polymer-solids-to-graphite-fiber ratio was approximately one to one. Next the polymer-coated fiber (prepreg) was heated to 175° C.–190° C. to drive off residual solvent and to convert the polyamic acid to the polyimide. This prepreg was held for composite fabrication.

Example VI

Preparation of Graphite-Fiber-Reinforced Composite: The prepreg from Example V was cut into three-inch-square pieces and placed in a three inch by three inch matched-metal-die mold with the fiber all aligned in the same direction (unidirectional). Ten plies of the prepreg were stacked in this manner and the mold was placed in a hydraulic press and the mold was heated to 350° C. with 300 psi pressure being applied when the temperature reached approximately 150° C. The mold and prepreg were held at 350° C. under 300 psi for one hour and then cooled to ambient conditions before the pressure was released. A well consolidated composite part was removed from the mold. The resin content of the molded composite was calculated to be approximately 35 percent.

Example VII

Preparation of Coating/Film: A solution was prepared from the polymer as prepared in Example I by diluting ten parts of the diglyme solution with one part of an amide solvent (N,N-dimethylacetamide). This solution was doctored onto a glass plate at 0.015 inch to 0.020 inch thickness and allowed to air dry overnight (16 hours) in a low humidity environmentally-controlled chamber. This resulting tack-free film was placed in an air circulating oven and heated for one hour each successively at 100° C., 200° C. and 300° C. followed by cooling to room temperature. The coating that resulted was well adhered to the glass plate. This coating was removed by steeping the coated glass in warm water overnight (16 hours). After this period the polymer film was easily removed from the glass to afford a free standing film. This film was approximately 0.0016 inch thick. This film was cut into 0.5 inch by 10.0 inch samples for tensile testing. A summary of test data on these films is shown in Table I.

TABLE I

| Sample Number | FILM PROPERTIES* | | | |
|---|---|---|---|---|
| | Yield Strength psi | Tensile Strength psi | Tensile Modulus psi | Elongation % |
| Room Temperature Test | | | | |
| 1 | 11100 | 16600 | 439900 | 5.1 |
| 2 | 10600 | 17400 | 426100 | 6.3 |
| 3 | 10000 | 17900 | 464400 | 7.2 |
| 4 | 8600 | 17200 | 597600 | 5.6 |
| 5 | 11700 | 19300 | 490800 | 7.1 |
| Avg. | 10400 | 17700 | 483800 | 6.3 |
| 200° C. test | | | | |
| 6 | 5100 | 7000 | 285700 | 6.2 |
| 7 | 6400 | 7700 | 306500 | 22.8 |
| 8 | 5200 | 6600 | 306500 | 6.4 |
| 9 | 5400 | 7000 | 266100 | 9.4 |
| 10 | 5300 | 6700 | 295600 | 23.2 |
| Avg. | 5500 | 7000 | 292100 | 13.6 |

*Film Thickness, 0.0016 inch

Example VIII

Preparation of Adhesive Tape: Solutions of the compositions of Examples I and II, i.e., ODPA/3,4'-ODA 15 wt. % solids in diglyme, were used to prepare adhesive tapes as follows. The above solutions were diluted to 7.5 wt. % solids in diglyme and applied to style 112, A1100 finish E-glass cloth which had been dried for one-half hour at 100° C. in a forced-air oven. Said coated cloths were air dried for one hour at room temperature, another coat of 7.5 wt. % solution applied, air dried for one hour at room temperature and heated for one hour at each of these temperatures: 100° C., 150° C. and 175° C. Subsequently, applications of a nominal 15 wt. % solids solution were applied onto each cloth and heated as follows after each application until a nominal thickness of 0.010 inch was obtained: (1) room temperature (RT) for one hour; (2) RT→100° C., held one hour; (3) 100° C.→150° C., held one hour; (4) 150° C.→175° C., held one hour. The area to be bonded was coated (primed) on each adherend with the 15 wt. % solids solution of ODPA/3,4'-ODA and air dried for one-half hour; it was heated for 15 minutes at 100° C. and 15 minutes at 150° C. prior to bonding with the adhesive tape.

Example IX

Adhesive Bonding: The prepared adhesive tapes from Example VIII were cut into strips sufficient to cover the bond area so as to give a 0.5 inch overlap for surface-treated (Pasa Jell 107) titanium alloy (Ti-6Al-4V) four-fingered panel adherends. Each tape was placed between the overlapped panels and the specimens were assembled in a bonding jig in such a manner as to hold the specimens securely while being bonded. The assembly was placed in a hydraulic press and 300-500 psi pressure was applied. The temperature, which was monitored by a thermocouple spot welded next to the bondline of one of the specimens, was increased from room temperature to 343° C. or 371° C. over a period of approximately 40 minutes. The temperature of the specimen was held at the final temperature for one hour, while pressure was maintained. The heat was turned off and the press allowed to cool, under pressure, to less than 150° C. At that time the bonded panel was removed from the press and the bonding jig, the individual lap shear specimens were separated with a metal shearer and the lap shear strengths were determined according to the procedure for ASTM D-1002. Results are given in Tables II and III.

matic anhydride, and a molar deficit in the 3,4'-oxydianiline monomer is compensated with twice the molar amount of monofunctional aromatic amine.

3. The composition of claim 2, wherein the unbalanced stoichiometry is such that a 2.5-5.0 percent molar deficit exists for the 4,4'-oxydiphthalic anhydride and 5.0-10.0 mole percent of phthalic anhydride is used as the endcapper.

4. The composition of claim 3 mixed with graphite fiber and processed to form a well consolidated composite.

5. A high temperature polyimide composition prepared by reacting 4,4'-oxydiphthalic anhydride and 3,4'-oxydianiline, at a concentration of approximately 30 weight percent or below, in 2-methoxyethyl ether.

6. A high temperature polyimide composition pre-

TABLE II

ADHESIVE STRENGTH FOR BONDED Ti-6Al-4V UNENDCAPPED POLYMER

| Bonding Conditions | | | | | | | |
|---|---|---|---|---|---|---|---|
| Pressure, psi | Temperature, °C. | Time Held at Temp., hours | Average Bondline Thickness, mils | Test Temperature, °C. | Average LSS,[a] psi | Range of LSS, psi | Type of Failure,[b] |
| 300 | 343 | 1 | 9.1 | RT | 5390 | 5050-5550 | Co |
| | | | 9.2 | 177 | 3620 | 3550-3680 | Co |
| | | | 9.2 | 204 | 2260 | 2040-2400 | Co |
| | | | 8.9 | 232 | 820 | 710-920 | Ad |
| 500 | 343 | 1 | 8.3 | RT | 5000 | 4290-5750 | Co |
| | | | 8.4 | 177 | 4030 | 3970-4130 | Co |
| | | | 8.6 | 204 | 2130 | 1880-2370 | Co |
| | | | 8.5 | 232 | 850 | 750-950 | Ad |
| 300 | 371 | 1 | 8.6 | RT | 4620 | 4400-4730 | Co |
| | | | 9.2 | 177 | 3700 | 3620-3840 | Co |
| | | | 9.2 | 204 | 3060 | 2930-3150 | Co |
| | | | 8.9 | 232 | 1320 | 1040-1540 | Co/Ad |

[a]Average of four or more tests; LSS = Lap Shear Strength
[b]Cohesive - Co, Adhesive - Ad

TABLE III

ADHESIVE STRENGTH FOR BONDED Ti-6Al-4V FIVE PERCENT ENDCAP

| Bonding Conditions | | | | | | | |
|---|---|---|---|---|---|---|---|
| Pressure, psi | Temperature, °C. | Time Held at Temp., hours | Average Bondline Thickness, mils | Test Temperature, °C. | Average LSS,[a] psi | Range of LSS, psi | Type of Failure,[b] |
| 300 | 343 | 1 | 4.3 | RT | 6390 | 6300-6500 | Co |
| | | | 4.3 | 177 | 4710 | 4270-4990 | Co |
| | | | 4.4 | 204 | 3470 | 3370-3610 | Co |
| | | | 4.4 | 232 | 1310 | 1100-1390 | Ad |
| 500 | 343 | 1 | 3.8 | RT | 6620 | 6430-6790 | Co |
| | | | 3.8 | 177 | 4830 | 4760-5010 | Co |
| | | | 3.6 | 204 | 3690 | 3560-3880 | Co |
| | | | 3.7 | 232 | 990 | 830-1190 | Ad |
| 300 | 371 | 1 | 4.2 | RT | 6420 | 6340-6570 | Co |
| | | | 4.3 | 177 | 5310 | 5150-5660 | Co |
| | | | 4.0 | 204 | 4120 | 3960-4310 | Co |
| | | | 4.1 | 232 | 1350 | 1230-1540 | Ad |

[a]Average of four or more tests; LSS = Lap Shear Strength
[b]Cohesive - Co, Adhesive - Ad

What is claimed as new and desired to be secured by Letters Patent of the United States is:

1. A high temperature polyimide composition prepared by reacting 4,4'-oxydiphthalic anhydride and 3,4'-oxydianiline.

2. The composition of claim 1 which has been endcapped with up to about 10 mole percent of a monofunctional aromatic amine or a monofuctional aromatic anhydride and having unbalanced stoichiometry such that a molar deficit in the dianhydride is compensated with twice the molar amount of monofunctional aropared by reacting 4,4'-oxydiphthalic anhydride and 3,4'-oxydianiline, at a concentration of approximately 30 weight percent or below, in 2-methoxyethyl ether, wherein the polyimide has been endcapped with about 5-10 mole percent of a monofunctional aromatic amine or a monofunctional aromatic anhydride and having unbalanced stoichiometry such that a molar deficit in the dianhydride is compensated with twice the molar amount of monofunctional aromatic amine, and the unbalanced stoichiometry is such that a 2.5-5.0 percent molar deficit exists for the 4,4'-oxydiphthalic anhydride and 5.0–10.0 mole percent of phthalic anhydride is used as the endcapper.

7. A process for preparing a molding powder from the composition of claim 3, which process comprises:
   (a) chemically imidizing by the addition of excess triethylamine followed by the addition of excess acetic anhydride;
   (b) subsequently thermally treating to at least 150° C., until complete imidization occurs.

8. A process for preparing a well consolidated unfilled molding, which process comprises devolitilizing the composition of claim 3, and then pressing at a temperature of at least approximately 200° C.

9. A process for preparing a high temperature defect-free coating, which process comprises coating the polyamic acid solution of the composition of claim 1 on a substrate and thermally treating the coating to at least 150° C. until complete imidization occurs.

10. A process for preparing a creasable, transparent, high temperature film, which process comprises casting a polyamic acid solution of the composition of claim 1 upon a substrate, drying the cast solution to form a film, thermally imidizing the film and removing the thermally imidized film from a substrate.

11. A process for preparing an adhesive tape, which process comprises coating the composition of claim 1 onto glass cloth and raising the temperature incrementally to approximately 175° C.

12. A process for preparing an adhesive tape, which process comprises coating the composition of claim 3 onto glass cloth and raising the temperature incrementally to approximately 175° C.

13. A process for preparing adhesively bonded specimens, which process comprises placing the adhesive tape according to claim 11 in a bondline area and heating the adherends to near or above 230° C. under adequate pressure to affect flow.

14. A process for preparing adhesively bonded specimens, which process comprises placing the adhesive tape according to claim 12 in a bondline area and heating the adherends to near or above 230° C. under adequate pressure to affect flow.

15. A process for preparing a high temperature defect free coating, which process comprises diluting the composition of claim 1 in 2-methoxyethyl ether with at least approximately 10 weight percent of a highly polar solvent, then casting on a substrate where the solvent is allowed to evaporate, and subsequently thermally treating the coating to a final temperature of near or above 230° C. to completely imidize the system.

16. A process for preparing a free standing film of the composition according to claim 15, wherein the coating is removed after steeping in water for adequate time to affect removal of the substrate.

17. A process for preparing a polymer coated graphite fiber, which process comprises coating the composition according to claim 3 on graphite to afford an approximately 1 to 1 weight ratio of polymer solids to fiber.

18. A process for preparing a graphite reinforced composite which process comprises coating the composition according to claim 3 on graphite to afford an approximate 1 to 1 weight ratio of polymer solids to fiber, drying at a temperature high enough to affect imidization and solvent removal; then cutting and stacking the coated graphite and finally laminating the stack at a pressure high enough to affect consolidation of the coated graphite at a temperature near or above 230° C.

* * * * *